United States Patent Office 2,999,837
Patented Sept. 12, 1961

2,999,837
INHIBITION OF MOLD CORROSION FOR QUATERNIZED POLYMERS
Boris Franzus, Bartlesville, Okla., assignor to Phillips Petroleum Company, a corporation of Delaware
No Drawing. Filed Apr. 29, 1957, Ser. No. 655,537
15 Claims. (Cl. 260—45.7)

This invention relates to a method of preventing corrosion of molds when curing a composition comprising quaternizable heterocyclic nitrogen-base polymer and quaternizing agent. In another aspect this invention relates to a compounded stock comprising quaternizable heterocyclic nitrogen-base polymer and quaternizing agent which can be cured with substantially no resulting corrosion of the curing molds. In still other aspects this invention relates to a product comprising a quaternized heterocyclic nitrogen-base polymer which can be made by molding and curing without corroding the curing molds, and to a method of making such a product.

Quaternized polymers of heterocyclic nitrogen bases of the pyridine and quinoline series which have been cured are valuable materials for many applications. These compounds are quite resistant to the action of oils and various types of solvents. Good oil resistance enables these materials to be especially useful as gasket stock. Serious corrosion of the curing molds has been observed, however, when these quaternized stocks are molded and cured. It has been observed that the corrosion problem is particularly serious when quaternizing with certain organic halides. This problem has existed for several years and its magnitude is such that commercial use of these valuable quaternized polymers is at stake. Corrosion or mold pitting of any degree cannot be tolerated by fabricators of finished rubber articles. Serious consideration has been given to such costly solutions as gold or silver plating the molds or constructing them of titanium metal. Such solutions have obvious drawbacks since the industry would be extremely reluctant to abandon its chromium plated and steel molds currently in use.

I have discovered that the above-described corrosion problem can be successfully solved by incorporating into the polymer stock prior to curing a corrosion inhibiting amount of a material selected from the class of substituted aromatic compounds consisting of aromatic acids and metal salts thereof, aromatic nitriles, and styrene oxide and homologs thereof. The metal salts which are applicable are the alkali metal, nickel, copper, iron or lead salts of the aromatic acid. Broadly, the compounds which I have found valuable in inhibiting corrosion of quaternized stocks to the point of substantially or completely eliminating such corrosion during curing are compounds having the formula selected from the group consisting of (A)
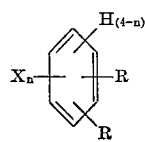

(B)
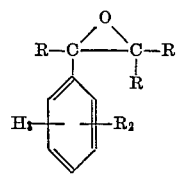

and (C) metal salts of Formula A containing at least one carboxy substituent, where each X is selected from carboxy and cyano and $n$ is an integer from 1 to 3, said X's when plural being positioned on nonadjacent ring carbon atoms, and each R is selected from hydrogen and lower alkyl, the metal of said metal salts being selected from alkali metals, nickel, iron, copper and lead. By lower alkyl I mean alkyl radicals having from 1 to 6 and preferably 1 to 4 carbon atoms. By balancing the amounts of quaternizing agent and a corrosion inhibitor as above defined, the problem of mold corrosion can be solved without deleterious effects upon the quaternized product.

It is an object of this invention to provide a method of curing compositions comprising quaternizable heterocyclic nitrogen-base polymers and quaternizing agents with substantially no mold corrosion. It is another object of this invention to provide a method of making such a quaternized product without costly damage from corrosion to the curing molds. Still another object is to provide a compounded stock containing (1) a polymer prepared from a monomer system comprising a polymerizable heterocyclic nitrogen-base monomer and (2) a quaternizing agent, which can be molded and cured without damaging the molds. Another object is to provide a product from materials comprising a heterocyclic nitrogen-base monomer which product can be formed by quaternizing and curing in steel molds without corrosion thereof. Other objects, advantages and features will be apparent to those skilled in the art from the following description, examples and appendant claims.

Quaternized heterocyclic nitrogen-base polymers are known in the art and their formation per se is not a part of this invention. These polymers which have proved especially valuable are those prepared from polymerizable heterocyclic nitrogen-base compounds of the pyridine and quinoline series either as homopolymers or with other materials copolymerizable therewith such as conjugated dienes and monomers having an active vinylidene group. These polymers and their quaternization are fully described in the copending application of Pritchard, filed June 4, 1956, Serial No. 588,957, now abandoned.

The polymers to which this invention applies can be prepared by any suitable method, such as by emulsion polymerization. For example, copolymers of heterocyclic nitrogen-base monomers and conjugated dienes can be formed over a wide range of molecular weights ranging from fluid and very viscous liquids to hard solid rubbery materials.

One convenient method of preparing these polymers is by polymerization of the monomers in an aqueous emulsion in the presence of soap, potassium persulfate and an aliphatic mercaptan. At the conclusion of the reaction a short-stopping agent and an antioxidant are added. Coagulation can be effected by various well-known techniques and the polymer dried. Heating in vacuum at a temperature of about 60° C. for about 48 hours is generally sufficient to dry the polymer. Other well-known polymerization recipes can also be used for preparing the polymers employed in the practice of this invention. The heterocyclic nitrogen-base monomers which are used to prepare the polymers for my invention have the formula

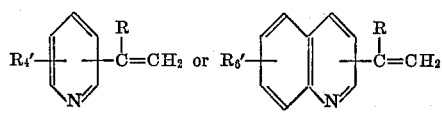

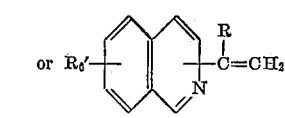

where R is a hydrogen or a methyl radical and each R' is an alkyl radical or a hydrogen, the combined R' groups having not over 12 carbon atoms. It is to be understood that mixtures of various copolymerizable heterocyclic nitrogen bases and materials copolymerizable therewith, preferably conjugated dienes, can be employed in the formation of these polymers together with, if desired, up to about 50 percent by weight, preferably between 5 and 30 percent by weight of the total monomeric material, of other copolymerizable materials, such as acrylonitrile, styrene, and the like.

Representative heterocyclic nitrogen-base compounds useful in the practice of this invention include: 2-vinylpyridine; 2-methyl-5-vinylpyridine; 5 - methyl-2-vinylpyridine; 3-ethyl-5-vinylpyridine; 5-ethyl-2-vinylpyridine; 4-methyl-3-vinylpyridine; 2,3,4-trimethyl-5-vinylpyridine; 2-isopropenylpyridine; 5-propyl-2 - isopropenylpyridine; 2-octyl-5-vinylpyridine; 5-dodecyl-2-vinylpyridine; 2-vinylquinoline; 8-ethyl-2-vinylquinoline; 4-hexyl-5-vinylquinoline; 1-vinyl-isoquinoline; 5-methyl-1-isopropenylisoquinoline; and the like.

Materials copolymerizable with the above-mentioned heterocyclic nitrogen-base compounds include conjugated dienes and other copolymerizable materials such as styrene; alpha-methyl-styrene; halogen-, alkyl-, and alkoxy-substituted styrenes; acrylonitrile; methacrylonitrile; methyl acrylate; methyl methacrylate; ethyl acrylate; ethyl methacrylate; methyl vinyl ketone; methyl isopropyl ketone; methyl vinyl ether; and the like.

The conjugated dienes employed in the production of the copolymers employed in the practice of this invention are preferably those conjugated dienes which contain four to six, inclusive, carbon atoms per molecule and include 1,3-butadiene, isoprene, piperylene, methylpentadiene, 2,3-dimethyl-1,3-butadiene, chloroprene and others. However, conjugated diolefins having more than 6, such as 8, carbon atoms per molecule can also be used. Furthermore, various alkoxy, such as methoxy and ethoxy, and cyano derivatives of these conjugated diolefins can also be used in preparing the polymers for my invention.

For the production of the copolymers employed in the practice of my invention the amount of copolymerizable material employed, such as a conjugated diene, is generally in the range of from 25 to 98 parts per 100 parts by weight of the total monomeric material, preferably 50 to 98 parts per 100 parts by weight, and the amount of copolymerizable heterocyclic nitrogen base employed is in the range from 75 to 2 parts per 100 parts by weight of the total monomeric material, preferably 50 to 2 parts per 100 parts by weight, the proportions of the monomeric material employed depending upon the type of copolymer desired.

Quaternizing agents or mixtures thereof which yield solid polymers in accordance with this invention are numerous and include various halogen substituted hydrocarbons such as substituted cycloalkanes and substituted alkanes. These compounds contain at least one hydrogen atom attached to a carbon atom. The substituted alkanes in turn include alkyl halides, alkylene halides, and aromatic substituted halogenated alkanes. Representative cycloalkanes include 1,2-dibromocyclohexane, 1-methyl-2,3-dichlorocyclopentane, and the like. Representative alkyl halides include methyl iodide, methyl bromide, ethyl iodide, propyl iodide, hexyl iodide, nonyl iodide, cetyl bromide, and the like. Representative alkylene halides include 1,2-dichloroethane, 1,2-dibromoethane, 1,2-dichloropropane, 1,2-dibromooctane, and the like. Representative aromatic substituted halogenated alkanes include benzyl chloride, benzal chloride, benzotrichloride, and halogenated xylenes, particularly the chlorinated xylenes such as 1,3-, and 1,4-bis(trichloromethyl)benzene; 1,2-, 1,3- and 1,4-bis(dichloromethyl)benzene; 1,2-, 1,3-, and 1,4-bis(monochloromethyl)benzene; 1-trichloromethyl-2-dichloromethylbenzene; 1-trichloromethyl-4-monochloromethylbenzene; 1 - dichloromethyl-3-monochloromethylbenzene; and the like.

Other halogen substituted alkanes include bromoform, chloroform, iodoform and the like which contain at least one hydrogen atom attached to a carbon atom. The substituted halogenated hydrocarbons also include 2,3-dibromopropene-1 and various polyhalogenated alkanes such as 1,2,3,4-tetrabromobutane and polyhalogenated cycloalkanes such as hexachlorocyclopentadiene. Other halogenated organic compounds useful as quaternizing agents include acetyl chloride, chloroacetyl chloride, ethylene chlorohydrin, picryl chloride, benzoyl chloride, benzene sulfonyl chloride, and the like. Another useful group of quaternizing agents includes methyl sulfate, ethyl sulfate, methylbenzene sulfate, and the like. The foregoing enumeration is not intended to include all the possible suitable quaternizing agents, but is only representative since many others can be used.

The quaternizing agents for which I have found my invention especially valuable in the inhibition of serious mold corrosion are those agents having a multiplicity of functional groups on the same carbon atom, particularly organic halides, such as benzotrichloride, benzal chloride and hexachloro-p-xylene. Specific polymers for which I have found my invention particularly useful are polymers which are prepared by polymerizing a monomer system comprising, as the heterocyclic nitrogen-base monomer, 2-vinylpyridine or 2-methyl-5-vinylpyridine. The homopolymer can be used but generally the heterocyclic nitrogen-base monomers are copolymerized with a conjugated diene such as butadiene or formed as the terpolymer with acrylonitrile.

When quaternizing the above-described heterocyclic nitrogen-base containing polymers, an amount of quaternizing agent is generally employed which is sufficient to convert a portion of the pyridine or quinoline units of the polymer to the corresponding pyridinium or quinolinium units. If desired, more or less than a stoichiometric amount of quaternizing agent can be employed depending upon the desired physical properties of the product. Generally, the amount of quaternizing agent is about 0.2 to 1.1 mols per mol of reactive nitrogen in the polymer. Cellular products can be produced by employing an excess of quaternizing agent, for example, up to 5 mols per mol of reactive nitrogen. The curing temperature at which the quaternizing agent is reacted in the mold is usually in the range between 0 to 250° C. although higher or lower temperatures can be used. The time required to substantally completely effect a reaction is dependent upon the temperature employed and usually varies from a few minutes, about 5 to 10 minutes, to about 10 hours or more.

The aromatic compounds which are used as corrosion inhibitors when quaternizing heterocyclic nitrogen-base polymers according to my invention are compounds of the class previously defined, these compounds being commercially available or can be readily prepared from available compounds by methods well known to those skilled in the art. Examples of compounds of this type include styrene oxide, 1-phenyl-1,2-epoxypropane, 1-phenyl-1,2-epoxybutane, 2-phenyl- 1,2-epoxypropane, 3-methyl-4-phenyl-3,4-epoxyheptane, 2-phenyl-1,2-epoxyoctane, 1-(3,5-dimethylphenyl)- 1,2-epoxyethane, 1-(2-methyl-4-ethylphenyl)-1,2-epoxybutane, 2-(4-hexylphenyl)-3-methyl-2,3-epoxypentane, benzoic acid, isophthalic acid, terephthalic acid, trimesic acid, benzonitrile, isophthalonitrile, terephthalonitrile, trimesonitrile, 5-cyanoisophthalic acid, 4-cyanobenzoic acid, 3,5-di-cyanobenzoic acid, 2,3-dimethylbenzoic acid, 4-hexylbenzoic acid, 3-butyl-5-methylterephthalic acid, 2,4-dimethyltrimesic acid, 2-methyl-4-cyanobenzoic acid, 4,6-dimethyl-5-cyanoisophthalic acid, 4-propyl-3,5,-dicyanobenzoic acid, sodium benzoate, lithium benzoate, rubidium benzoate, cesium benzoate, iron benzoate, nickel benzoate, copper benzoate, monosodium terephthalate, monosodium isophthalate, monopotassium terephthalate, disodium terephthalate, dipotassium isophthalate, sodium 3-cyanobenzoate, nickel 2,4-dimethylbenzoate, lead 3,4-diethylbenzoate, copper 3,5-dicyanobenzoate, diiron 5-methyl-isophthalate, and the like.

In the use of metal salts for inhibiting corrosion of this type, nickel, copper, iron and lead salts have been found particularly valuable.

The quantity of corrosion inhibitor required to prevent mold corrosion when quaternized polymers of the type hereinbefore described are cured depends upon both the quaternizing agent and the particular corrosion inhibitor employed. Generally, however, the amount of corrosion inhibitor used is in the range of 0.05 to 3 mols of inhibitor per mol of quaternizing agent. It is ordinarily desirable to use the minimum amount of inhibitor necessary so that physical properties of the quaternized stock are not adversely affected. Greater amounts of inhibitor can be employed if desired when the application of the elastomer does not require high tensile strength and elongation. Optimum amounts of inhibitor can readily be determined for any given quaternizing agent.

Any of several suitable methods can be employed to incorporate the corrosion inhibitor into the polymeric material such as by mill mixing or masticating or by mixing in an internal mixer such as a Banbury mixer. These mixing methods are those generally employed in the art for compounding stocks of this nature prior to curing. Addition of the inhibitor to the latex prior to coagulation is an alternative method for inhibitors which will not be dissolved and washed from the coagulant into the serum.

To further describe my invention specific embodiments are set forth in the following examples which are meant to be exemplary only and should not be interpreted as limiting my invention unduly:

*Example I*

An 85/15 butadiene/2-methyl-5-vinylpyridine rubber, prepared by emulsion polymerization at 41° F., was compounded in a gasket stock recipe in which the rubber was quaternized with hexachloro-p-xylene. A rubber of this type can be obtained by copolymerizing butadiene with 2-methyl-5-vinylpyridine in accordance with the following recipe:

| | Parts by weight |
|---|---|
| Water | 200 |
| Butadiene | 85 |
| 2-methyl-5-vinylpyridine | 15 |
| Potassium fatty acid soap | 6 |
| KOH | 0.1 |
| KCl | 0.3 |
| Tamol N[1] | 0.3 |
| $FeSO_4 \cdot 7H_2O$ | 0.02 |
| Sequestrene AA[2] | 0.04 |
| Sodium formaldehyde sulfoxylate | 0.1 |
| p-Menthane hydroperoxide | 0.1 |
| Tert-dodecyl mercaptan, original charge | 0.24 |
| Tert-dodecyl mercaptan, increment at 60% conversion | 0.24 |

[1] Sodium salt of a naphthalene sulfonic acid condensed with formaldehyde.
[2] Ethylenediamine tetraacetic acid.

A conversion of 90–95 percent is reached in 20 hours when polymerization is effected in accordance with this recipe.

Nickel benzoate, benzoic acid, and sodium benzoate were employed as mold corrosion inhibitors in the gasket stock recipe. One run was made in which no corrosion inhibitor was present.

The recipe was as follows:

| | Parts by weight |
|---|---|
| Butadiene/2-methyl-5-vinylpyridine rubber | 100 |
| Carbon black [1] | 150 |
| Zinc oxide | 5 |
| Stearic acid | 1 |
| BLE [2] | 3 |
| Plasticizer SC [3] | 20 |
| Altax [4] | 3 |
| Sulfur | 0.25 |
| Hexachloro-p-xylene (0.032 mol) | 10 |
| Mold corrosion inhibitor [5] | 0 |
|    Nickel benzoate (0.017 mol) | 5 |
|    Benzoic acid (0.041 mol) | 5 |
|    Benzoic acid (0.082 mol) | 10 |
|    Sodium benzoate (0.035 mol) | 5 |
|    Sodium benzoate (0.069 mol) | 10 |

[1] Thermax. A soft, semi-reinforcing carbon black.
[2] High temperature reaction product of diphenylamine and acetone.
[3] Glycol ester of vegetable oil fatty acid.
[4] Benzothiazyl disulfide.
[5] Mols corrosion inhibitor per mol hexachloro-p-xylene:
  Nickel benzoate _____ 0.53
  Benzoic acid _____ 1.28, 2.56
  Sodium benzoate _____ 1.09, 2.16

The stocks were milled and cured 45 minutes at 307° F. against stainless steel shim stock. The shims were examined for pitting and tensile strength and elongation of the test specimens were determined. Results were as follows:

| Corrosion Inhibitor | phr [1] | 80° F. | | Pitting Rating [2] |
|---|---|---|---|---|
| | | Tensile, p.s.i. | Elongation, percent | |
| Nickel benzoate | 5 | 2,480 | 140 | 0–1 |
| Benzoic acid | 5 | 2,370 | 140 | 1 |
| Do | 10 | 2,360 | 140 | 0 |
| Sodium benzoate | 5 | 2,450 | 150 | 2 |
| Do | 10 | 2,420 | 200 | 0 |
| None | | 2,510 | 150 | 10 |

[1] Parts per 100 parts rubber.
[2] 0 = no pits; 10 = many pits.

As shown by the above data, benzoic acid and metal salts thereof in the class defined are quite effective in inhibiting corrosion of the stainless steel during quaternization of the elastomer. Corrosion was completely eliminated without adversely affecting to an appreciable degree the physical properties of the final product.

*Example II*

A 75/25 butadiene/2-methyl-5-vinylpyridine rubber, prepared by emulsion polymerization at 41° F., was compounded in a gasket stock recipe in which the rubber was quaternized with benzotrichloride. A rubber of this type can be obtained by copolymerizing butadiene with 2-methyl-5-vinylpyridine in accordance with the following recipe:

| | Parts by weight |
|---|---|
| Water | 200 |
| Butadiene | 75 |
| 2-methyl-5-vinylpyridine | 25 |
| Potassium fatty acid soap | 6 |
| KOH | 0.1 |
| KCl | 0.3 |
| Tamol N[1] | 0.3 |
| $FeSO_4 \cdot 7H_2O$ | 0.02 |
| Sequestrene AA[1] | 0.04 |
| Sodium formaldehyde sulfoxylate | 0.1 |
| p-Menthane hydroperoxide | 0.1 |
| Tert-dodecyl mercaptan, original charge | 0.24 |
| Tert-dodecyl mercaptan, increment at 60% conversion | 0.24 |

[1] As in Example I.

A conversion of 90–95 percent is reached in 20 hours when polymerization is effected in accordance with this recipe.

Styrene oxide and benzoic acid were employed as mold corrosion inhibitors in a gasket stock recipe. One run was made in which no corrosion inhibitor was present. The recipe was as follows:

| | Parts by weight |
|---|---|
| Butadiene/2-methyl-5-vinylpyridine rubber | 100 |
| Carbon Black[1] | 150 |
| Plasticizer SC[1] | 20 |
| Zinc oxide | 5 |
| Stearic acid | 1 |
| Sulfur | 0.25 |
| Altax[1] | 3 |
| Tuads[2] | 2 |
| BLE[1] | 3 |
| Benzotrichloride (0.102 mol) | 20 |
| Mold corrosion inhibitor[3] | 0 |
| Styrene oxide (0.10 mol) | 12 |
| Benzoic acid (0.098 mol) | 12 |

[1] As in Example I.
[2] Tetramethyl thiuram disulfide.
[3] Mols corrosion inhibitor per mol benzotrichloride
Styrene oxide _____ 0.98
Benzoic acid _____ 0.96

The stocks were milled and cured 30 minutes at 302° F. against stainless steel shim stock. The shims were examined for pitting. Results were as follows:

| Corrosion inhibitor: | Condition of Shim Stock |
|---|---|
| Styrene oxide | Not pitted. |
| Benzoic acid | Not pitted. |
| None | Pitted. |

Examples I and II illustrate satisfactory corrosion inhibition for quaternized butadiene/2-methyl-5-vinylpyridine rubber with varying amounts of heterocyclic nitrogen-base and quaternizing agent.

*Example III*

Fifty grams (0.413 mol) of 2-methyl-5-ethylpyridine was heated for 5.25 hours at 150° C. with five grams (0.0255 mol) of benzotrichloride. A corrosion inhibitor (0.0255 mol) was added to the liquid reaction mixture and also a piece of stainless steel shim stock measuring 2 x 1.5 inches and approximately 0.002 inch in thickness. Heating was continued for 1.5 hours at 150° C. and the shim stock was examined. Several runs were made in this manner using different corrosion inhibitors. A control run was made in which no corrosion inhibitor was added. In this instance the heating period was 30 minutes at 150° C. Results were as follows:

| Corrosion inhibitor: | Condition of Shim Stock[1] |
|---|---|
| Benzonitrile | 1 |
| Terephthalic acid | 0 |
| Benzoic acid | 0 |
| Sodium benzoate | 0 |
| Styrene oxide | 0 |
| None | 10 |

[1] 0=no pitting; 10=shim stock destroyed.

Formation of the pyridinium derivative by quaternization yields a corroding reaction mixture, the effect of which can be satisfactorily counteracted by the use of the corrosion inhibitors according to my invention. It is quite significant that the inhibitors of my invention provide complete or substantially complete protection against corrosion which would otherwise destroy stainless steel of the type used in curing molds.

I claim:

1. A compounded stock of quaternizable heterocyclic nitrogen-base polymer which can be cured with substantially no mold corroding effect comprising a polymer of a monomer system which comprises a vinyl-substituted pyridine compound and a copolymerizable conjugated diene having from 4 to 8 carbon atoms per molecule; an organic halide quaternizing agent which quaternizes with a mold corroding effect selected from the group consisting of hexachloro-p-xylene, benzotrichloride, and benzal chloride; and a corrosion inhibiting amount of at least 0.05 mol per mol of quaternizing agent of a compound having the formula selected from the group consisting of (A)
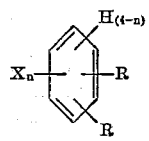

and (B) metal salts of Formula A containing at least one carboxy substitutent, where each X is selected from the group consisting of carboxy and cyano and $n$ is an integer from 1 to 3, said X's when plural being positioned on nonadjacent ring carbon atoms, and each R is selected from the group consisting of hydrogen and alkyl radicals having from 1 to 6 carbon atoms, the metal of said metal salts being selected from the group consisting of alkali metals, nickel, iron, copper and lead.

2. A compounded stock according to claim 1 wherein said pyridine compound is 2-methyl-5-vinylpyridine and said conjugated diene is 1,3-butadiene.

3. A method of forming a quaternized heterocyclic nitrogen-base polymer which comprises blending with a copolymer of butadiene and 2-methyl-5-vinylpyridine a quaternizing agent selected from the group consisting of hexachloro-p-xylene, benzotrichloride, and benzal chloride and from 0.05 to 3 mols per mol of quaternizing agent of a compound having the formula selected from the group consisting of (A)
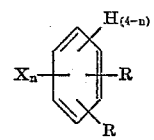

and (B) metal salts of Formula A containing at least one carboxy substituent, where each X is selected from the group consisting of carboxy and cyano and $n$ is an integer from 1 to 3, said X's when plural being positioned on nonadjacent ring carbon atoms, and each R is selected from the group consisting of hydrogen and alkyl radicals having from 1 to 6 carbon atoms, the metal of said metal salts being selected from the group consisting of alkali metals, nickel, iron, copper and lead, thereby forming a corrosion inhibited quaternizable stock, curing said stock in a mold and removing quaternized product.

4. A quaternized heterocyclic nitrogen-base polymeric product prepared by the process according to claim 3.

5. A compounded stock according to claim 1 wherein said monomer system comprises from 50 to 98 parts by weight of said conjugated diene and from 2 to 50 parts by weight of said pyridine compound, said quaternizing agent is present in an amount of from 0.2 to 1.1 mols per mole of reactive nitrogen in the polymer and said corrosion inhibiting compound is present in an amount of 0.05 to 3 mols per mole of quaternizing agent.

6. A compounded stock of quaternizable heterocyclic nitrogen-base polymer which can be cured with substantially no mold corroding effect comprising a polymer of a monomer system which comprises a vinyl substituted pyridine compound and a copolymerizable conjugated diene having from 4 to 8 carbon atoms per molecule; a quaternizing amount of quaternizing agent having a multiplicity of functional groups on a single carbon atom and at least one hydrogen atom attached to a carbon atom and which quaternizes with a mold corroding effect; and a corrosion inhibiting amount of at least 0.05 mol per mol of quaternizing agent of a compound having the formula selected from the group consisting of (A)

$$X_n\text{—}\underset{R}{\underset{|}{\bigcirc}}\text{—}R \quad H_{(4-n)}$$

and (B) metal salts of Formula A containing at least one carboxy substituent, where each X is selected from the group consisting of carboxy and cyano and $n$ is an integer from 1 to 3, said X's when plural being positioned on nonadjacent ring carbon atoms, and each R is selected from the group consisting of hydrogen and alkyl radicals having from 1 to 6 carbon atoms, the metal of said metal salts being selected from the group consisting of alkali metals, nickel, iron, copper and lead.

7. A method according to claim 3 wherein said copolymer is a polymerizate of a monomer system containing from 50 to 98 parts by weight of butadiene and from 2 to 50 parts by weight of 2-methyl-5-vinylpyridine and said quaternizing agent is employed in an amount of 0.2 to 1.1 mols per mol of reactive nitrogen in the polymer.

8. A composition of matter comprising a polymer of a monomer system comprising a heterocyclic nitrogen-base monomer having the formula selected from the group consisting of $$R_4'\text{—}\underset{N}{\bigcirc}\text{—}\underset{R}{\overset{|}{C}}=CH_2 \quad R_6'\text{—}\underset{N}{\bigcirc}\text{—}\underset{R}{\overset{|}{C}}=CH_2$$

and $$R_6'\text{—}\underset{N}{\bigcirc}\text{—}\underset{R}{\overset{|}{C}}=CH_2$$

where each R is selected from the group consisting of hydrogen and methyl and each R' is selected from the group consisting of hydrogen and alkyl radicals, the combined R' groups having not over 12 carbon atoms, and an organic halide quaternizing agent having at least one hydrogen atom attached to a carbon atom and a multiplicity of functional groups on a single carbon atom and which quaternizes with a mold corroding effect, said composition being stabilized against mold corrosion during curing with a compound selected from the group consisting of (A)

$$X_n\text{—}\underset{R}{\underset{|}{\bigcirc}}\text{—}R \quad H_{(4-n)}$$

where each X is selected from the group consisting of carboxy and cyano, $n$ is an integer of 1 to 3, said X's when plural being positioned on nonadjacent ring carbon atoms, and each R is selected from the group consisting of hydrogen and alkyl radicals having from 1 to 6 carbon atoms, and (B) salts of (A) containing at least one carboxy substituent with a metal selected from the group consisting of alkali metals, nickel, copper, iron and lead.

9. A method of forming a quaternized heterocyclic nitrogen-base polymeric product so that while curing said product corrosion of the curing molds is substantially eliminated which comprises blending with a polymer of a monomer system comprising a substituted heterocyclic nitrogen-base monomer having the formula selected from the group consisting of $$\underset{N}{\bigcirc}\text{—}\underset{R}{\overset{|}{C}}=CH_2 \quad R_6'\text{—}\underset{N}{\bigcirc}\text{—}\underset{R}{\overset{|}{C}}=CH_2$$

and $$R_6'\text{—}\underset{N}{\bigcirc}\text{—}\underset{R}{\overset{|}{C}}=CH_2$$

where each R is selected from the group consisting of hydrogen and methyl and each R' is selected from the group consisting of hydrogen and alkyl radicals, the combined R' groups having not over 12 carbon atoms, an organic halide quaternizing agent having at least 1 hydrogen atom attached to a carbon atom and more than one halogen atom attached to a single carbon atom and which quaternizes with a mold corroding effect, and a compound selected from the group consisting of (A)

$$X\text{—}\underset{R}{\underset{|}{\bigcirc}}\text{—}R \quad H_{(4-n)}$$

where each X is selected from the group consisting of carboxy and cyano, $n$ is an integer of 1 to 3, said X's when plural being positioned on nonadjacent ring carbon atoms, and each R is selected from the group consisting of hydrogen and alkyl radicals having from 1 to 6 carbon atoms, and (B) salts of (A) containing at least one carboxy substituent with a metal selected from the group consisting of alkali metals, nickel, copper, iron and lead, thereby forming a quaternizable stock stabilized against mold corrosion during curing, and curing said stock in a mold to produce a quaternized product.

10. A method according to claim 9 wherein said corrosion inhibiting compound is nickel benzoate.

11. A method according to claim 9 wherein said corrosion inhibiting compound is sodium benzoate.

12. A method according to claim 9 wherein said corrosion inhibiting compound is benzoic acid.

13. A method according to claim 9 wherein said corrosion inhibiting compound is benzonitrile.

14. A method according to claim 9 wherein said corrosion inhibiting compound is terephthalic acid.

15. A quaternized heterocyclic nitrogen-base polymeric product prepared by the process according to claim 9.

References Cited in the file of this patent

UNITED STATES PATENTS

| | | |
|---|---|---|
| 2,364,410 | Whittaker | Dec. 4, 1944 |
| 2,725,361 | Hwa | Nov. 29, 1955 |
| 2,734,881 | Lally et al. | Feb. 14, 1956 |
| 2,751,323 | Pritchard et al. | June 19, 1956 |
| 2,860,117 | Pritchard et al. | Nov. 11, 1958 |

UNITED STATES PATENT OFFICE

CERTIFICATE OF CORRECTION

Patent No. 2,999,837 September 12, 1961

Boris Franzus

It is hereby certified that error appears in the above numbered patent requiring correction and that the said Letters Patent should read as corrected below.

Column 9, lines 44 and 45, for "a multiplicity of functional groups on" read -- more than one halogen atom attached to --; column 10, lines 7 to 11, the left-hand formula should appear as shown below instead of as in the patent:

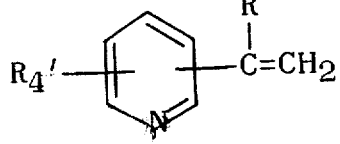

Signed and sealed this 6th day of March 1962.

(SEAL)
Attest:

ERNEST W. SWIDER
Attesting Officer

DAVID L. LADD
Commissioner of Patents